Sept. 15, 1931.    E. RUPP    1,823,703
LIGHT CONTROL DEVICE
Filed Dec. 26, 1929
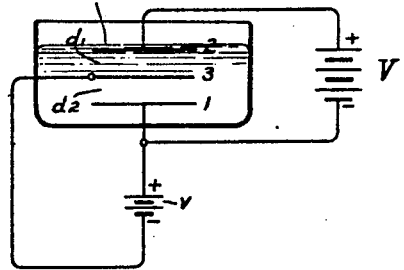
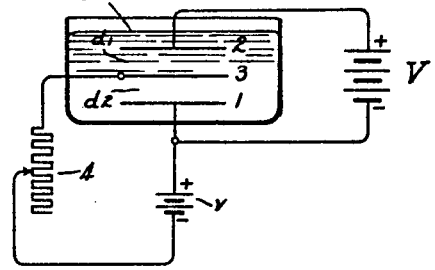
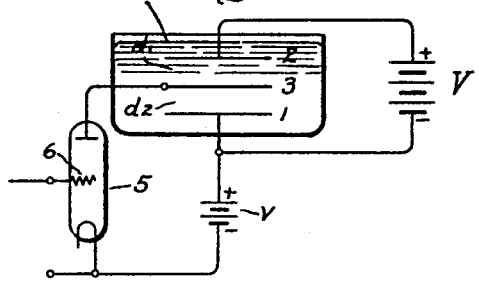
Inventor:
Emil Rupp,
By Charles E. Mulla
His Attorney.

Patented Sept. 15, 1931

1,823,703

UNITED STATES PATENT OFFICE

EMIL RUPP, OF BERLIN-FROHNAU, GERMANY, ASSIGNOR TO GENERAL ELECTRIC COMPANY, A CORPORATION OF NEW YORK

LIGHT CONTROL DEVICE

Application filed December 26, 1929, Serial No. 416,732, and in Germany February 22, 1929.

My invention relates to light control devices and has for its principal object the provision of an improved light control device of the type including a fluid possessing optical characteristics which are affected by an electrostatic field.

It has been proposed to control or modulate a beam of light in accordance with electrical impulses which for example may be dependent on the shade of the successive elemental areas of the picture or the light. One means of accomplishing this result is a Kerr cell. Such a cell includes electrodes mounted in a liquid which possesses optical properties affected by an electrostatic field and which is capable of varying the amount of light transmitted through it in accordance with the electrical impulses applied to the electrodes. In order to increase the insulating strength of the liquid, and determine the part of the light transmitting characteristic on which the apparatus is operated, it is customary to apply a direct current potential between the electrodes and to superimpose a control or modulating potential on this direct current potential.

It is known that the field strength between the anode electrode and the cathode electrode is not constant but increases greatly in the immediate vicinity of the cathode and toward the cathode. This part of the voltage drop between the anode and the cathode is designated hereinafter as the cathode drop. Presence of the cathode drop in the cell has the effect that the glow of the controlled or modulated light in the immediate neighborhood of the cathode is more intense than in other parts of the liquid.

The present invention utilizes the cathode drop for the control of light. For this purpose an auxiliary electrode is mounted between the main cathode and anode of the device. The function of this electrode is to displace the cathode drop. By utilizing the displaced cathode drop to control the light transmitted through the cell, greater steepness of the operating characteristic is produced, the intensity of the controlled light is increased, less amplification of the control impulses before they are applied to the main electrodes of the cell is required, and the part of the operating characteristic on which the apparatus operates is readily determined.

My invention will be better understood from the following description when considered in connection with the accompanying drawings and its scope will be pointed out in the appended claims.

Referring to the drawings, Fig. 1 is a diagrammatic showing of a Kerr cell arrangement wherein my invention has been embodied; Fig. 2 is similar to Fig. 1 except that it illustrates an adjustable resistor connected between the cathode and the control electrode; and Fig. 3 illustrates an arrangement wherein control potential is applied to the control electrode through a space discharge device.

The Kerr cell illustrated by the various figures of the drawings includes a cathode 1, an anode 2 and a control electrode 3. Connected between the cathode 1 and the anode 2 is a suitable source of direct current potential shown as a battery V. The control electrode 3 is connected to the anode 1 through a source of potential shown as a battery $v$. As previously indicated, the intensity of the light transmitted through the doubly refracting liquid $3'$ of the Kerr cell tends to be greatest in the region of the cathode 1. Thus in the absence of the control electrode 3 the intensity of the controlled light is greatest in the region $d_2$, while the intensity of the light transmitted through the region $d_1$ tends to be very low. The effect of the control electrode 1 is to displace the cathode drop and render the light transmitted through the region $d_1$ more intense. The increased intensity of the light transmitted through the region $d_1$ in the cell is due to the fact that this region is subjected to a voltage which is resultant of the voltages of the batteries V and $v$.

If an adjustable resistance 4 (see Fig. 2) is connected between the control electrode 3 and the battery $v$, the position of the cathode drop or high light intensity area can be readily determined by adjustment of the resistor, thus varying the intensity of the light transmitted through the region $d_1$ of the cell. If the resistance is made zero, the resultant voltage of the batteries V and $v$ is effective in the space $d_1$. If the resistance 4 is made very large, the effect of the battery $v$ may be canceled and the character of the cathode drop is determined almost entirely by the battery V. It is thus possible by varying the resistance 4 and observing the light transmitted through the space $d_1$ to plot the light transmitting characteristic of the apparatus. With an increase of the resistance 4 starting from a zero value, the field strength in the space $d_1$ decreases as the value of the resistance is increased more rapidly than the increase in resistance due to the fact that the cathode drop is moved closer to the anode. A similar result may be secured if the battery $v$ is omitted and the control electrode 3 is directly connected to the cathode through the resistance 4. When the battery $v$ is utilized it may be small as compared with the battery V.

The resistor 4 of Fig. 2 may be replaced by any suitable device which has its resistance controlled in accordance with the control impulses to be converted into light by the cell. As indicated by Fig. 3, an electron discharge device 5 provided with a grid 6 may be utilized. In the operation of this embodiment of the invention the electrical impulses which are to be converted into corresponding light impulses are applied to the grid 6 through an amplifying device which, as has been previously explained, may be smaller than those heretofore utilized for this purpose because of the comparatively high intensity of the light transmitted through the cell when the control electrode 3 is provided. If desired, a resistor similar to the resistor 4 may be connected in series with the discharge device 5 for controlling the operating characteristic of the cell. It is found that a special advantage of the improved apparatus is the fact that even when the distance $d_1$ between the control electrode 3 and the anode 2 is comparatively great, control of the light transmitted through space $d_1$ is readily attained by proper selection of the voltage of the battery V and of the potential difference between the control electrode 3 and the cathode.

While the cell has been illustrated as provided with electrodes which are parallel with one another, it should be understood that my invention is not limited to any particular structure.

What I claim as new and desire to secure by Letters Patent of the United States, is:

1. A light control device including a doubly refracting liquid affected by an electrostatic field, a cathode and an anode mounted in said liquid, and a control electrode arranged between the cathode and anode to control the position of the cathode drop in said liquid.

2. A light control device including a doubly refracting fluid affected by an electrostatic field, a pair of main electrodes and a control electrode mounted in said liquid, a source of unidirectional potential connected between said main electrodes, and a source of potential connected between said control electrode and one of said main electrodes.

3. A light control device including a doubly refracting fluid affected by an electrostatic field, and a cathode, a control electrode and an anode mounted in said liquid, means for subjecting said cathode and anode to a unidirectional potential, said control electrode being mounted between said anode and cathode near the boundary of the cathode drop produced between said anode and cathode by said potential, and means for applying electrical impulses to said control electrode.

4. A light control device including a doubly refracting fluid affected by an electrostatic field, and a cathode, a control electrode and an anode mounted in said liquid, means for subjecting said cathode and anode to a unidirectional potential, said control electrode being mounted between said anode and cathode near the boundary of the cathode drop produced between said anode and cathode by said potential, and means including a space discharge device for applying electrical impulses to said control electrode.

5. A light control device including a doubly refracting fluid affected by an electrostatic field, and a cathode, a control electrode and an anode mounted in said liquid, said control electrode being arranged between the cathode and the anode, means for subjecting said cathode and anode to a unidirectional potential, and means including a space discharge device and a source of potential arranged to apply electrical impulses to said control electrode.

In witness whereof, I have hereunto set my hand this 10th day of December, 1929.

EMIL RUPP.